United States Patent [19]
Woodley

[11] Patent Number: 4,617,719
[45] Date of Patent: Oct. 21, 1986

[54] TAPE STAKING AND CONTROL APPARATUS

[75] Inventor: George M. Woodley, Shrewsbury, Mass.

[73] Assignee: King Instrument Corporation, Westboro, Mass.

[21] Appl. No.: 787,779

[22] Filed: Oct. 15, 1985

[51] Int. Cl.$^4$ ............................................. B23P 19/00
[52] U.S. Cl. ..................................... 29/564.6; 29/563;
29/566.1; 29/806; 29/809; 53/430; 226/92;
242/56 R; 360/95
[58] Field of Search ..................... 29/563, 564.1, 564.8,
29/566.1, 703, 564.6, 705, 707, 806, 809, 281.1,
783, 791, 33 Q, 33 S; 53/430, 218 W, 118;
242/56 R, 195; 226/92; 360/134, 95

[56] References Cited
U.S. PATENT DOCUMENTS

| 3,499,202 | 3/1970 | Napor et al. | 29/806 X |
| 3,518,746 | 7/1970 | Hoover | 53/430 X |
| 3,668,759 | 6/1972 | Kendall | 29/566.1 |
| 3,677,505 | 7/1972 | van Taylor | 242/56 R |
| 3,848,825 | 11/1974 | Zielke | 242/56 R |
| 4,113,196 | 9/1978 | Rehklau | 242/56 R |
| 4,114,252 | 9/1978 | Kon et al. | 29/563 |
| 4,247,977 | 2/1981 | Nakamura | 29/806 X |
| 4,383,660 | 5/1983 | Richard et al. | 360/95 X |
| 4,387,499 | 6/1983 | Schwartz et al. | 29/564.1 X |
| 4,512,527 | 4/1985 | Rehklau et al. | 242/56 R |

Primary Examiner—Gil Weidenfeld
Assistant Examiner—Glenn L. Webb
Attorney, Agent, or Firm—Schiller & Pandiscio

[57] ABSTRACT

There is disclosed in the present application an apparatus for staking to a leader block the trailing end of a length of magnetic tape wound on a reel of a substantially closed cartridge. The leader block is sized and shaped to fit into and close an opening in the wall of the cartridge and later when the cartridge is in use to provide a means by which the tape may be grasped to be withdrawn from the cartridge. The present apparatus is mounted on a movable platform which permits its withdrawal to a retracted loading position out of the way of a cartridge loading or winding operation. In its retracted position, the apparatus is provided with a short length of rod to be used later for securing the trailing end to the block by staking the rod length with the tape end into an appropriately sized slot in the leader block. In addition to a nest for receiving a rod length in position for a future staking operation, the present apparatus includes a staking punch and devices for advancing and retracting the movable platform. There is also included in the apparatus a series of apertures connected to a vacuum source for holding the tape temporarily at a location where it is to be cut after the cartridge is fully loaded and thereafter to cooperate in controlling the tape with other instrumentalities for initiating the next winding operation.

31 Claims, 16 Drawing Figures

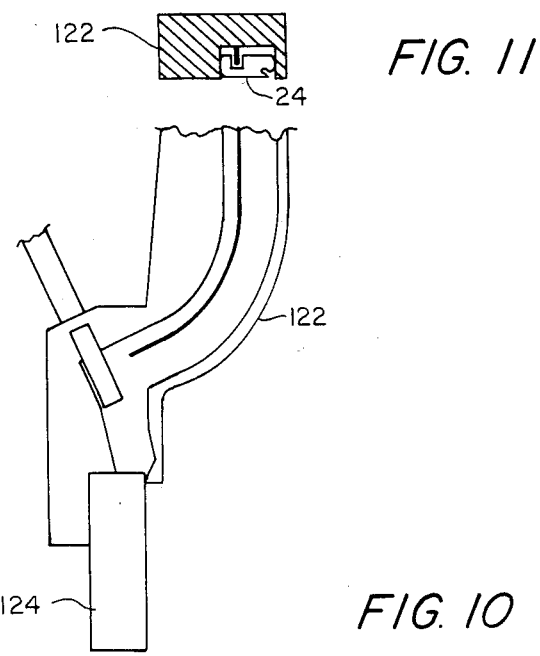
FIG. 11
FIG. 10
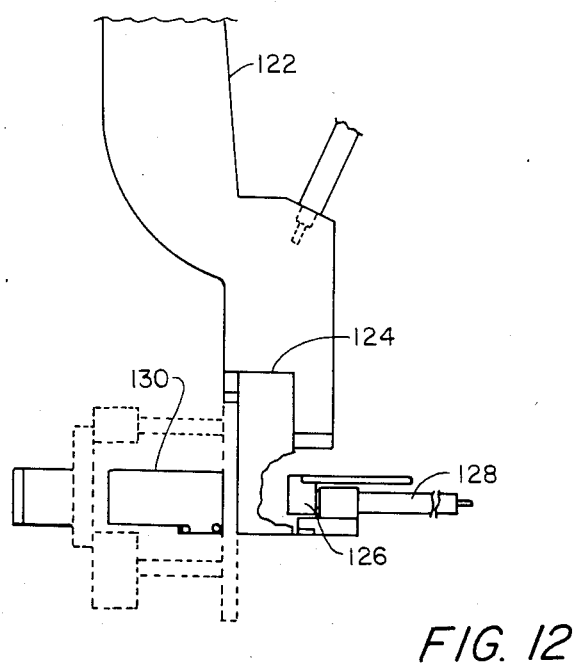
FIG. 12

TAPE STAKING AND CONTROL APPARATUS

The present invention relates generally to improvements in apparatus in a tape winding machine for securing the trailing end of a length of magnetic tape wound in a cartridge to some form of handle by which the tape in use may later be withdrawn from the cartridge and more particularly to such apparatus adapted to operate in a crowded environment to secure, by staking, the trailing end to a leader block shaped and sized to fit and close a limited opening in the wall of a otherwise substantially closed cartridge.

The loading of magnetic tape into cartridges to be employed for recording data in computer applications presents special problems in avoiding contamination of the tape which could interfere with the accurate storage of data. In order to avoid the introduction of contaminants, the cartridge relating to the present invention is of essentially closed construction except for a limited access opening through which the tape is wound and later moved in and out of the cartridge. The tape is loaded into the cartridge after the empty cartridge has been cleaned and the loading takes place under the most stringent control of the environment to assure cleanliness. The trailing end of the tape is secured to a leader block which provides both a closure for the cartridge opening and a handle by which the tape is later gripped by an appropriate coupler at a tape handling mechanism associated with a computer, withdrawn from the cartridge in use. The securement of the trailing end of the tape to the leader block, its severing from the supply and the control of the tape for its accurate positioning before, during and after severing present several difficult problems in a machine for winding tape into such cartridges.

It is accordingly a general object of the present invention to improve the control of tape being loaded into cartridges by winding machines.

Another object is to increase the reliability of automatic operation of tape winding machines so that they may be operated without the continuing attention of individual operators.

A more specific object is to improve the reliability of operations of such machines by providing more accurate control of the tape during a brief part of the operating cycle while the tape is stopped for completing a cartridge loading procedure and preparing for initiating the next tape winding operation.

The foregoing objects are achieved in accordance with a feature of the present invention by an apparatus mounted on a movable platform which is held in a retracted location in a tape winding machine during the major portion of the machine cycle. The apparatus is advanced with the platform through a mounting plate which supports the various mechanisms of the machine, to a forward active position in which it performs a plurality of functions required for the complete loading of a succession of cartridges. In its retracted position, the apparatus is furnished with the requirements for the next staking operation, a leader block and a short length of rod for securing the trailing end of the tape to the block. As the apparatus advances to its forward position, the tape leading from the loaded cartridge to the supply reel is trapped between the leader block and a control surface which thereafter attracts and temporarily retains the tape by vacuum acting through by means of sets of apertures in the surface connected to a vacuum source. While the tape is thus retained, it is severed from the supply, the trailing end is secured to the leader block by a staking punch in accordance with another feature of the invention and control of the leading end from the supply reel is passed to a finger for the start of the next winding operation according to a still further feature of the invention.

The foregoing objects and features, together with many advantages of the present invention will be more fully understood and appreciated from the following detailed description of an illustrative embodiment, taken in connection with the accompanying drawings in which:

FIG. 10 is a fragmentary detail view showing a guideway for delivering leader blocks for the staking operation;

FIG. 11 is a view in cross section depicting the positioning of leader blocks in the guideway of FIG. 11;

FIG. 12 is a fragmentary detail view depicting elements of the apparatus associated with the guideway of FIGS. 10 and 11 for delivering leader blocks to the staking and control apparatus of FIG. 4;

Before describing the apparatus in detail with reference the drawings, the complete operation of the machine will be described briefly to provide a better understanding of the function of the apparatus of the present invention and the specific problems that it solves. A cartridge to be loaded with tape is first cleaned at a cleaning station before being shuttled to a winding station to receive its supply of magnetic tape. At the winding station, a tape control and insertion finger introduces the leading end of the tape from a supply reel through a relatively small opening in the wall of a substantially closed cartridge to a reel in the cartridge to initiate the winding oepration. The function, operation and construction of the finger is described in detail in my copending application Ser. No. 787,780, filed Oct. 15, 1985, and will not be described in detail herein except as necessary to provide a clear understanding of the present invention.

At the winding station, a predetermined quantity of tape is wound into the cartridge and then, at the end of the winding, the various instrumentalities of the present apparatus are activated to sever the tape from the supply, to secure the trailing end of the tape already in the cartridge to a leader block which is then inserted into the opening in the wall of the cartridge before the completely processed cartridge is discharged from the winding station. At the time of securing the trailing end to the leader block, the present apparatus maintains a temporary hold on the leading end of the tape from the supply and thereafter cooperates with the inserting finger to prepare for the next winding operation.

Figure 15:
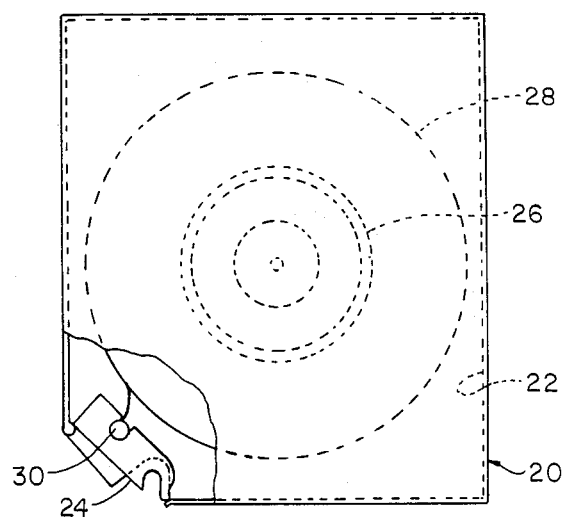
FIG. 15 is a detail view in front elevation of a cartridge of the type for which the present apparatus is employed.

Turning now to the drawings, particularly FIG. 15, there is shown a typical substantially closed tape cartridge indicated generally at 20, of the type upon which the present machine operates. The cartridge 20 is formed with a peripheral wall 22 having a single opening closed by a leader block 24. The cartridge 20 contains a reel 26 on which is wound a pre-determined length of magnetic tape 28, the trailing end of which is secured to the leader block 24 by a short length of rod 30. The leader block 24 is sized and shaped to close the opening in the wall 22 and to provide a coupling means engageable later in use, by an instrumentality of a tape handling mechanism for unwinding the tape from the cartridge.

There is shown in FIGS. 1 to 4, a tape winding machine indicated generally at 32, having cleaning and winding stations 34 and 36 respectively and incorporating apparatus according to the present invention. The machine 32 is especially adapted to performing winding operations automatically and the staking and control apparatus according to the present invention not only performs the function of securing the trailing end of the tape 28 to the leader block 24 but is also an important control element for the tape at the time that the quantity of tape from a fully wound cartridge is severed and the leading end of the tape from a supply reel is prepared for insertion into the next cartridge 20. The insertion of the leading end of the tape into the next cartridge is accomplished by apparatus including a finger 38 described in detail in my co-pending application but referred to in this application only to the extent of its cooperation with the present apparatus and to clarify the overall operation of the machine. The various machine instrumentalities are directed in their operation by a central controller 50 in the form of a commercially available programmable microprocessor.

Figure 1:
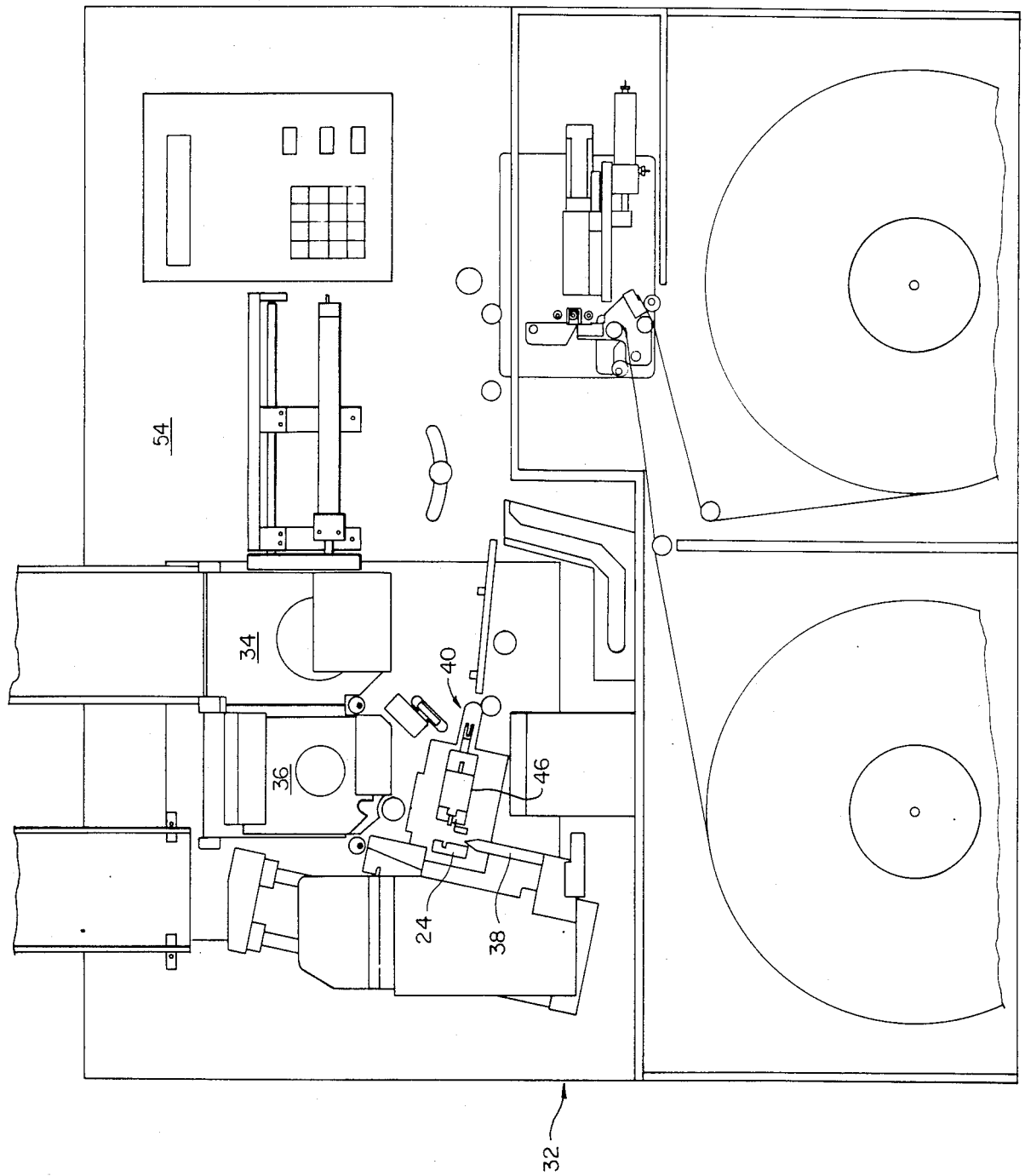
FIG. 1 is a view in front elevation of a tape winding machine including an apparatus for controlling the tape and for staking the trailing end of a wound tape to a leader block.
Figure 2:
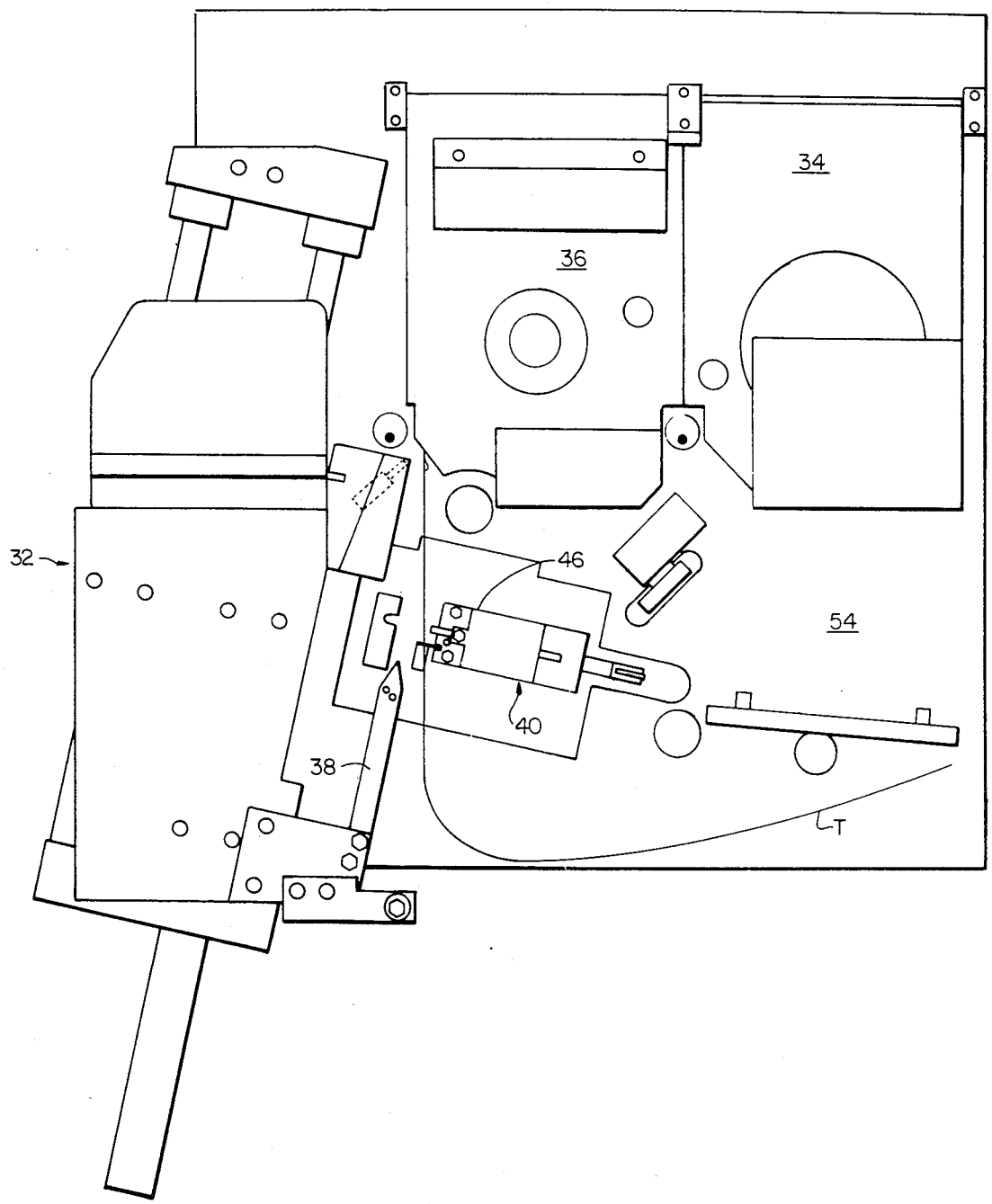
FIG. 2 is a view also in front elevation of a portion of the machine depicted in FIG. 1 but on a larger scale and showing with greater clarity various operative elements of the machine supported on the front of a mounting plate.
Figure 3:
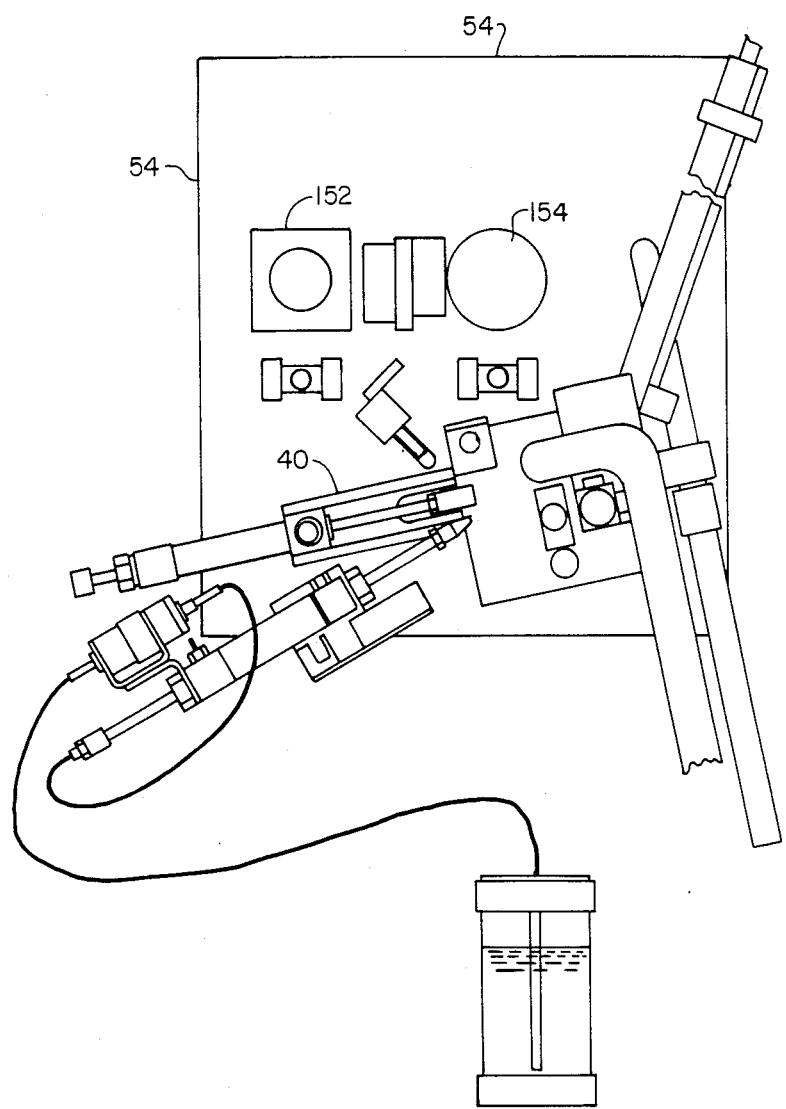
FIG. 3 is a view in rear elevation showing machine elements supported on the rear of the mounting plate.
Figure 4:
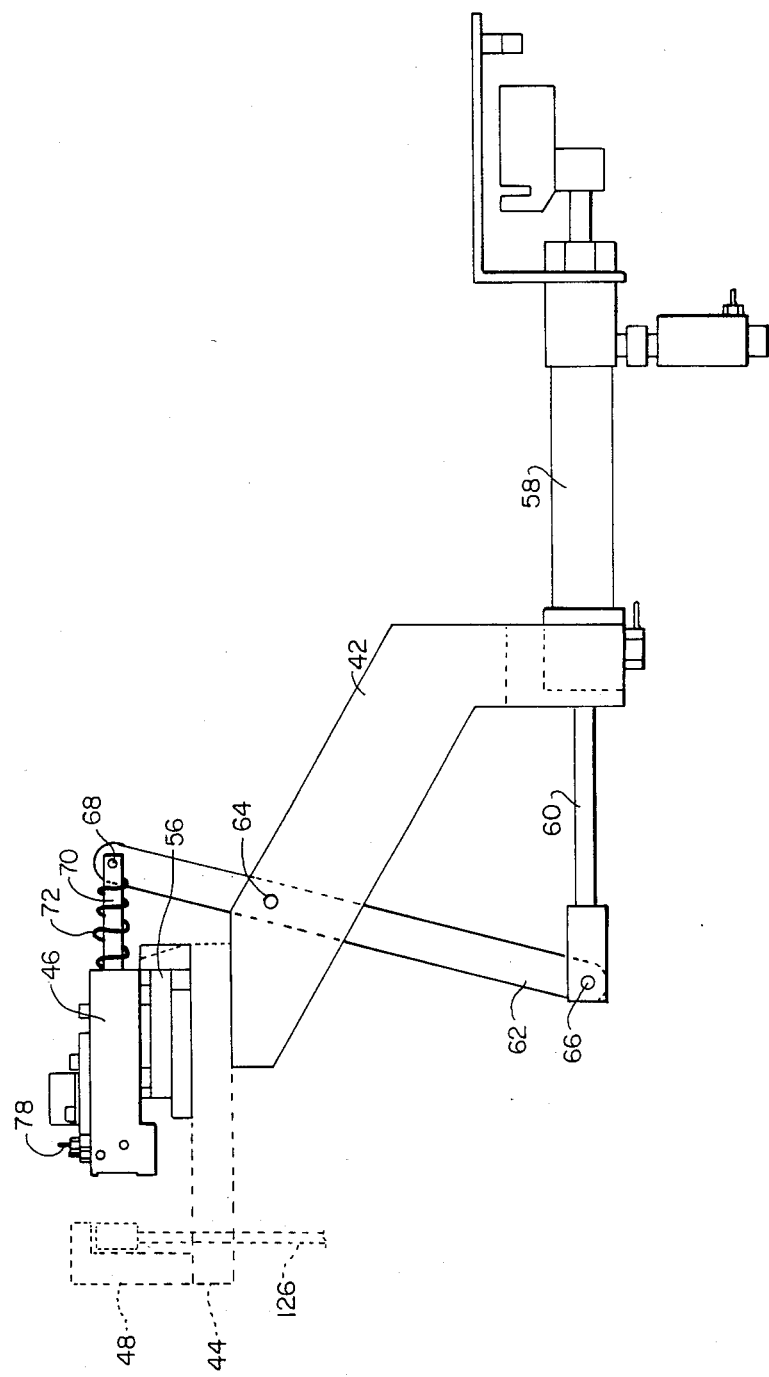
FIG. 4 is a detail view of an operative portion of a staking and control apparatus according to the present invention as seen from the bottom of the machine.
Figure 5:
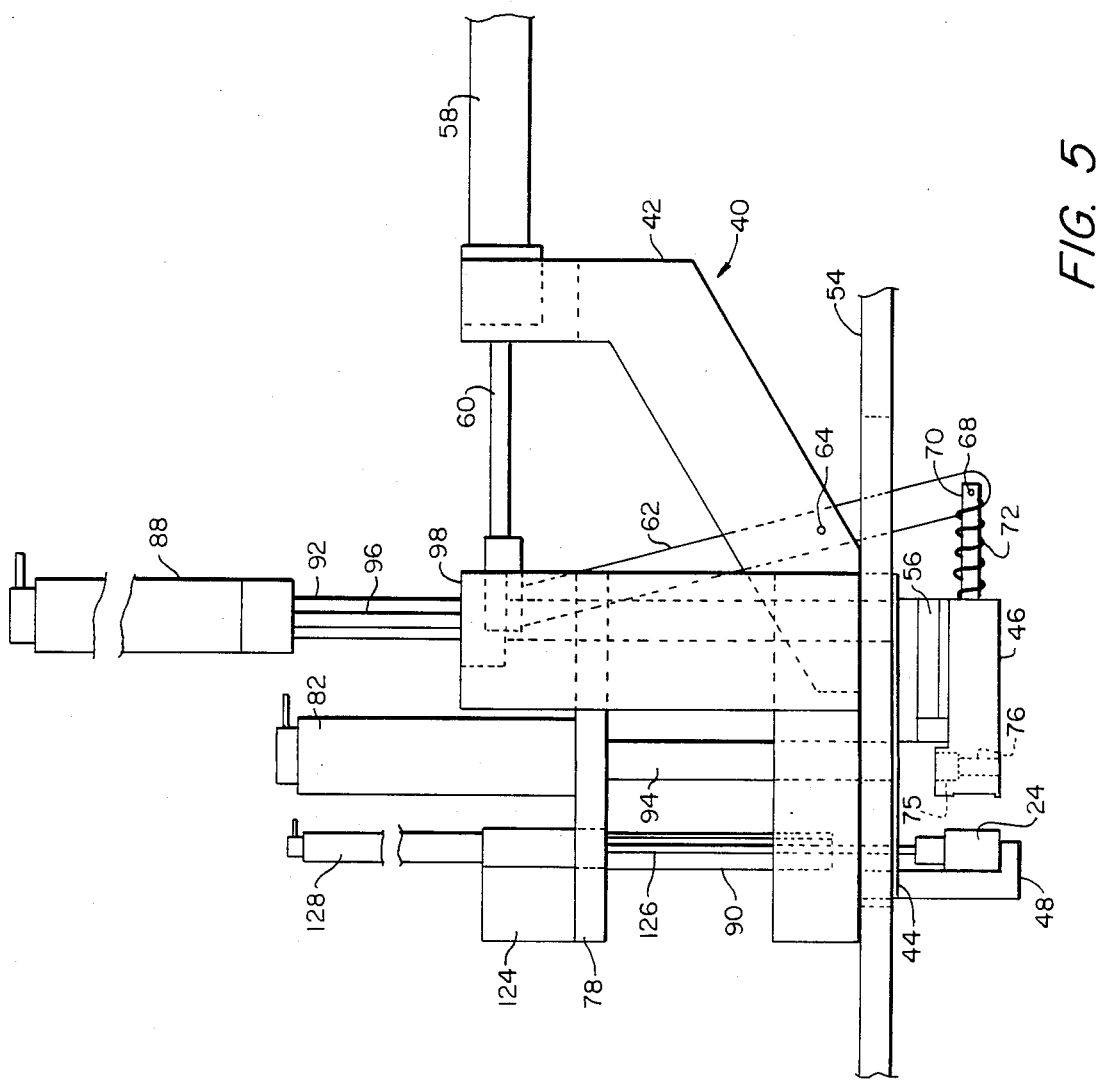
FIG. 5 is a plan view of that part of the apparatus depicted in FIG. 4 showing the operative portion in its active forward position and also depicting associated devices and means for extending and retracting the operative portion.
Figure 6:
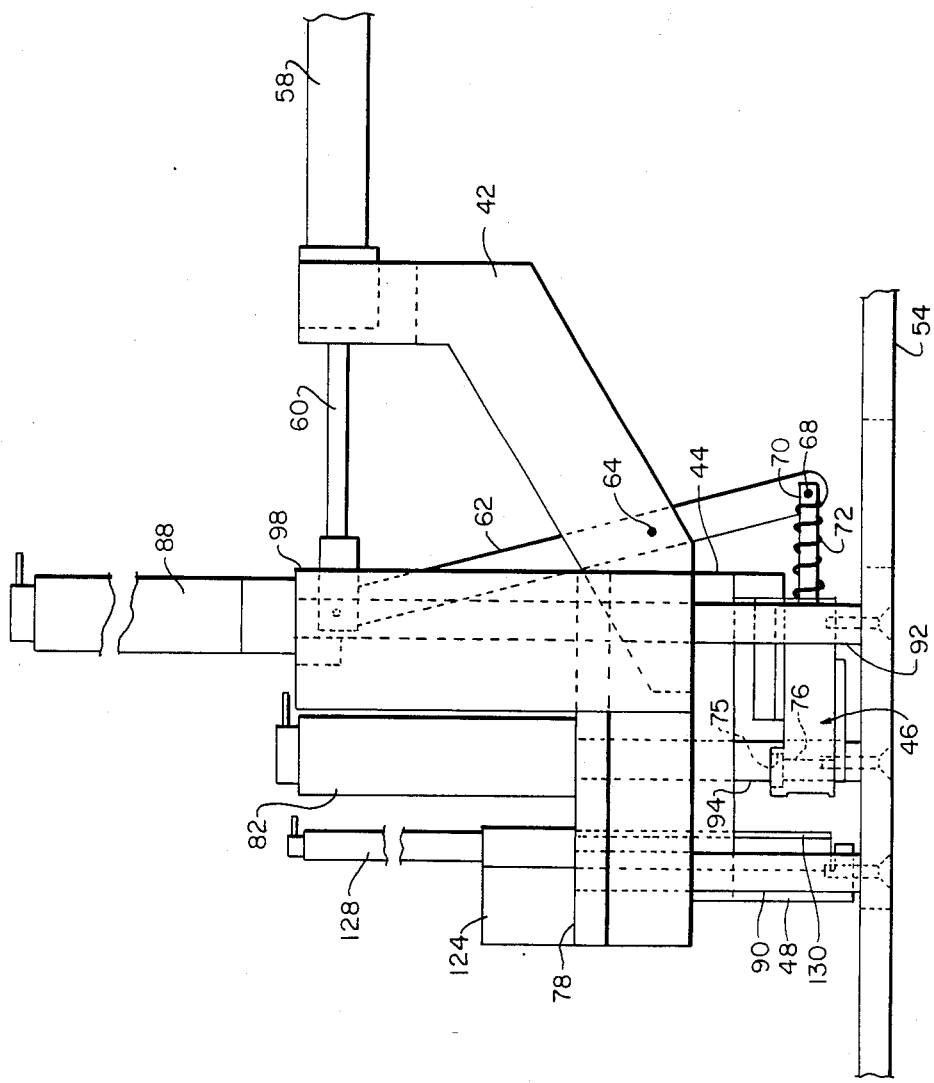
FIG. 6 is a plan view similar to FIG. 5 but showing the operative elements in their retracted position.
Figure 8:
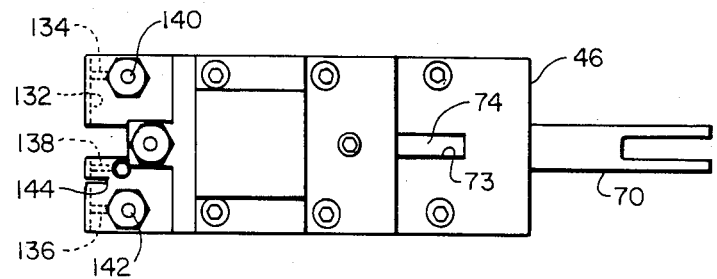
FIG. 8 is a view of the slide block of FIG. 7 but shown with its cover in place.
Figure 7:
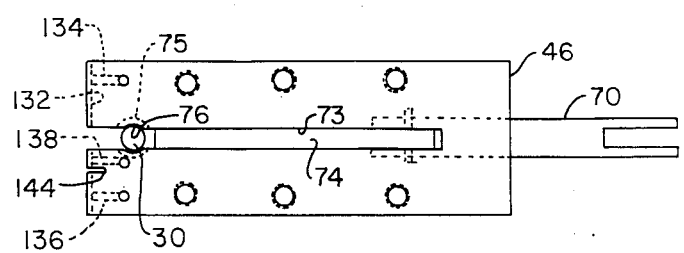
FIG. 7 is a fragmentary detail view of a slide block forming a part of the mechanism shown in FIG. 4, shown with a cover removed to reveal interior construction.

An important element of the present invention is a staking device indicated generally at 40 in FIGS. 4, 5 and 6. The staking device comprises a bracket 42 which supports those parts of the mechanism for operating upon the tape during a period between winding operations when no winding is taking place at the winding station 36. The bracket 42 is fixedly mounted on a movable plate 44 and is maintained in a retracted position seen in FIG. 6 while the actual winding is taking place, during a major portion of the operating cycle of the machine. An L-shaped leader block nest 48 and a slide 56 carrying a slide block 46 (also called a "staking block") are attached to plate 44. When plate 44 is in retracted positionm, slide block 46 and nest 48 are located behind a front panel or mounting plate 54 (FIG. 6). When plate 44 is advanced to its forward position, block 46 passes through an opening in plate 54 and during the remainder of the operating cycle is located ahead of the mounting plate (FIG. 5) until the finger 38 is about to be raised to enter the cartridge for initiating the next winding operation. Slide 56 allows block 46 to move toward and away from the nest 48. Block 46 is moved on plate 44 by an air cylinder 58 fitted with a piston rod 60. A lever 62, pivoted at 64 on the bracket 42 provides a connection between rod 60 and block 46. Lever 62 is pivotally connected at 66 at its rearward end to the rod 60 and at its forward end to a link 70 which is surrounded by a spring 72 compressed between the block 46 and the lever 62 and is pivotally linked to a staking punch 74. Punch 74 is slidably mounted in a slot 73 in block 46. Thus, when the rod 60 is retracted so that lever 62 pivots in a clockwise direction (FIG. 5), the block 46 is first advanced to the left to contact the leader block 24, as the spring 72 is compressed, and then link 70 imparts a sliding motion to staking punch 74 relative to block 46. There is also formed within the block 46 an enlargement or passageway 76 (FIGS. 5, 6 and 7) for receiving and retaining a selected length of resilient staking rod 30 for staking the trailing end of the tape to the leader block 24. The enlargement 76 intersects slot 73. The enlargement 76 is also formed with a shallow counterbore indicated at 75 whose function will hereinafter be described. The width of slot 73 as seen in FIGS. 7 and 8 is slightly less than the diameter of staking rod 30, while the diameter of round enlargement 76 that intersects slot 73 is slightly greater than the diameter of rod 30.

In order to assure that there is a rod length 30 in the enlargement for the staking operation, there is provided a sensing device to detect the absence of the necessary rod length. The sensing device is in communication (by a hose not shown) with a vacuum connector 77 that is mounted to block 46 so as to be closed off when a rod length 30 is disposed in the enlargement 76. When there is no staking rod in the enlargement, air flows through the connector, causing the sensing device to give a signal to stop the machine. The sensing device performs an additional function in sensing the preliminary displacement of the rod length 30 from the enlargement 76. This occurs as the punch is advanced a short distance by the retraction of the piston rod 60 to force the rod length 30 out of the enlargement 76 and into slot 73 while the staking device is still in its retracted position. This displacement of the rod length 30 out of the enlargement slot wedges the rod length securely into the slot and later in the cycle offers added resistance to the forward motion of the punch 74 to cause the block 46 to advance before the punch completes its staking operation. The displacement of the rod length from the enlargement 76 is detected by the sensing device after its presence in the enlargement has been established at an earlier time in the machine cycle.

Figure 9:
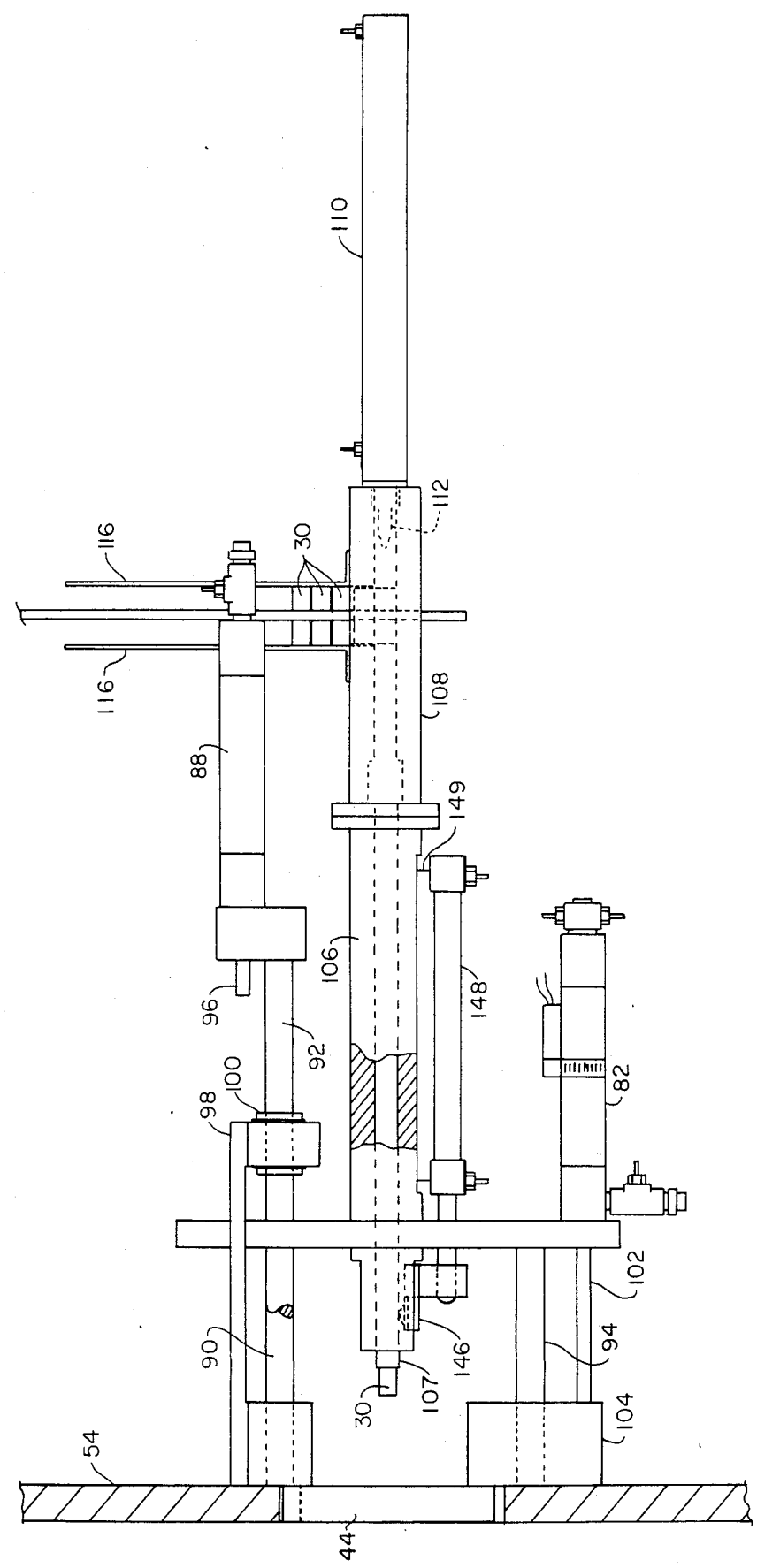
FIG. 9 is a plan view showing auxiliary mechanisms including a tape severing knife and a staking rod dispenser.

In addition to the movable plate 44, upon which the apparatus 40 is mounted for movement to and from a forward operative position, there is also included an auxiliary fixed plate 78 which is supported in spaced relationship behind the front panel 54. The auxiliary plate 78 supports a plurality of fixedly mounted components including two cylinders 82 and 88 employed respectively for retracting the movable plate 44 and for advancing it, thereby positioning the apparatus of FIG. 4 as necessary, either in its forward operative position or in its retracted inoperative position. In addition, there are also fixedly secured to the auxiliary plate 78 three parallel guide rods, two upper ones indicated at 90 and 92 and a lower one indicated at 94, as seen in FIG. 9, all of which pass loosely through bushed openings in the movable plate 44 and together provide a guideway for the movement of the plate between forward and retracted positions. The guide rods 90 and 94 are relatively short extending from the fixed plate 78 forwardly through the movable plate 44. The rod 92, however, extends rearwardly behind the plate 78 for dual purposes. The cylinder 88 is fixedly supported on the rearward end of the rod 94 and, for clamping the plate 44 and the staking device 40, has a piston rod 96 which is extended fowardly under the influence of pressurized air in the cylinder. The piston rod 96 abuts a rearwardly directed extension 98 affixed to the plate 44. In addition to its function of serving as an abutment for the piston rod 96, the extension 98 also includes an outboard bearing 100 in sliding engagement with the rod 92 for the purpose of maintaining the orientation of the movable plate 44 and of the mechanisms which is supports. The cylinder 82 is affixed directly to the plate 78 and is provided with a piston rod 102, the forward end of which passes through an opening in and is fixedly connected to a block 104 fixedly secured to the plate 44. Thus, when pressurized air is introduced into cylinders 82 and 88 under the direction of the controller 50, the rods 96 and 102 move the staking device 40 to its forward operative position.

There is also mounted on the auxiliary plate 78, a feeding mechanism for supplying appropriate lengths of staking rod 30 to the enlargement 76 in the block 46. The feeding mechanism includes a forward tube section 106 formed with a nose 107 fixedly mounted on the plate 78 and to which is also fixedly coupled a rearward section 108. An air cylinder 110 is affixed to the rearward end of the section 108 in coaxial relation with the passage inside the tubes and the cylinder 110 is provided with a piston rod 112 which has a relatively long travel to move staking rod lengths 30 from a supply maintained in alignment in a reservoir 114 by a pair of centering spaced apart fixed guide plates 116. The forward tube section 106 is maintained filled with rod lengths 30 arranged end to end and a new rod length is delivered by gravity from the reservoir 114 to the interior passage in the rearward tube 108. There the newly delivered staking rod length is advanced by the piston rod of the cylinder 110 so that it presses against the lengths ahead in the forward tube 106 to discharge a single length of staking rod into the enlargement 76 in the slide block 46. As seen in FIG. 9, the nose 107 is in position at the forward end of the tube 106 to enter the counterbore 75 when the plate 44 is retracted and retains the block 46 at the limit of its travel to the right (as seen in FIG. 5) until the plate 44 is projected forwardly (FIG. 6) to position the device 40 in its operative forward position.

Affixed to the back of the mounting plate 54 is a chute 122, seen in FIGS. 10 to 12, from which leader blocks 24 are delivered, one per operating cycle, to be staked to the trailing end of a tape wound in a cartridge 20.

Each leader block 24 is delivered by gravity from the chute 122 which is suitably gated to release the leader blocks one at a time in the appropriate time sequence. From the chute 122, the leader block drops through a guideway in an adapter block 124 to a position in the path of a push bar 126 actuated by an air cylinder 128 to advance the leader block over a guide 130 of L-shaped cross-section to the nest 48. The forward end of the bar 126 clamps the leader block and thereafter retains it in the nest 48 as the plate 44 moves forward. The cylinder 128 is fixedly supported on the auxiliary plate 78, as also seen in FIGS. 5 and 6. The bar 126 is guided in an opening in the block 124 and is coupled to the piston rod of the air cylinder 128 energized under the direction of the controller 50. The bar 124 thus performs the functions of moving the leader block 24 to the nest 48 but also advances with the nest as the staking device 40 is moved forwardly to its operative position. Thereafter, until after the completion of the staking operation, the bar 124 retains the leader block positioned in the nest to receive the rod length 30.

As shown in FIGS. 7 and 8, the slide block 46 is formed at its leftward end with a tape control surface in the form of a shallow groove 132 into the bottom of which are three sets of apertures, an upper set 134, a lower set 136 and an intermediate set 138, the upper set being located above the punch 74 and the intermediate and lower sets being located below the punch. The upper set of apertures 134 is in communication with a vacuum source through a connector 140 and the intermediate and lower sets of apertures through a connector 142. Between the intermediate and lower sets of apertures 136 and 138, there is a shallow slot 144 in the block to accommodate a cutting blade 146, seen in FIG. 9, which is actuated under the direction of the controller 50 to project the blade forward through the slot 144 to sever the tape at the end of the winding operation. The blade 146 is projected forwardly by an actuator in the form of an air cylinder 148 fixedly secured to the underside of the forward staking rod supply tube 106. The severing of the tape takes place while the tape is under the control of the vacuum connected apertures in the groove 132 and before the trailing end of the tape from the loaded cartridge is staked to the leader block 24.

Figure 14:
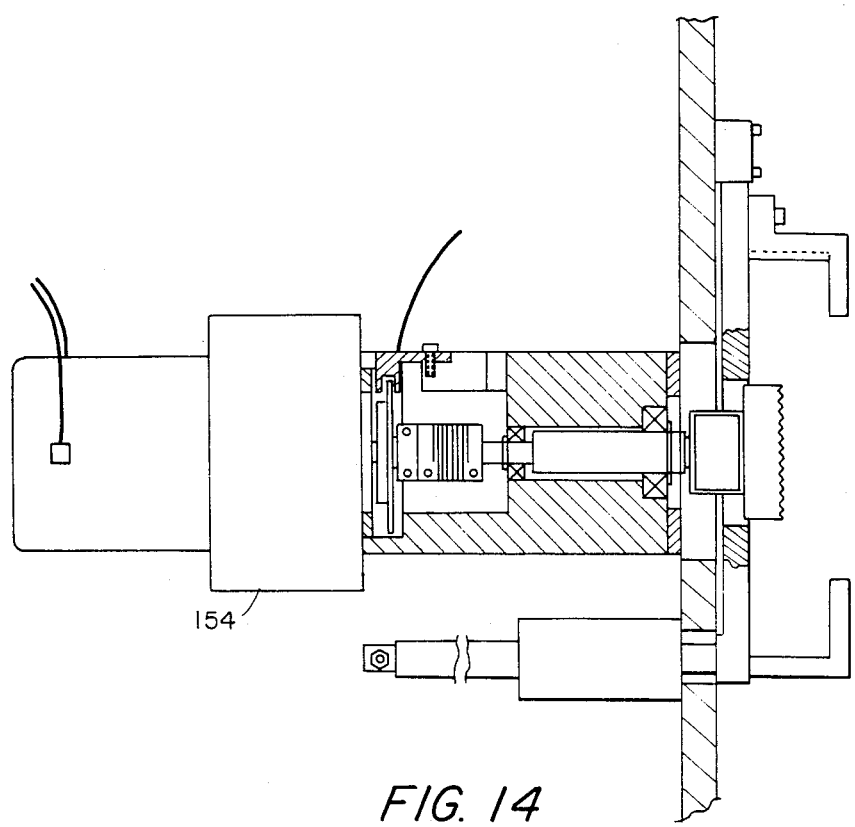
FIG. 14 is a plan view similar to FIG. 13 but showing drive elements at the winding station.
Figure 13:
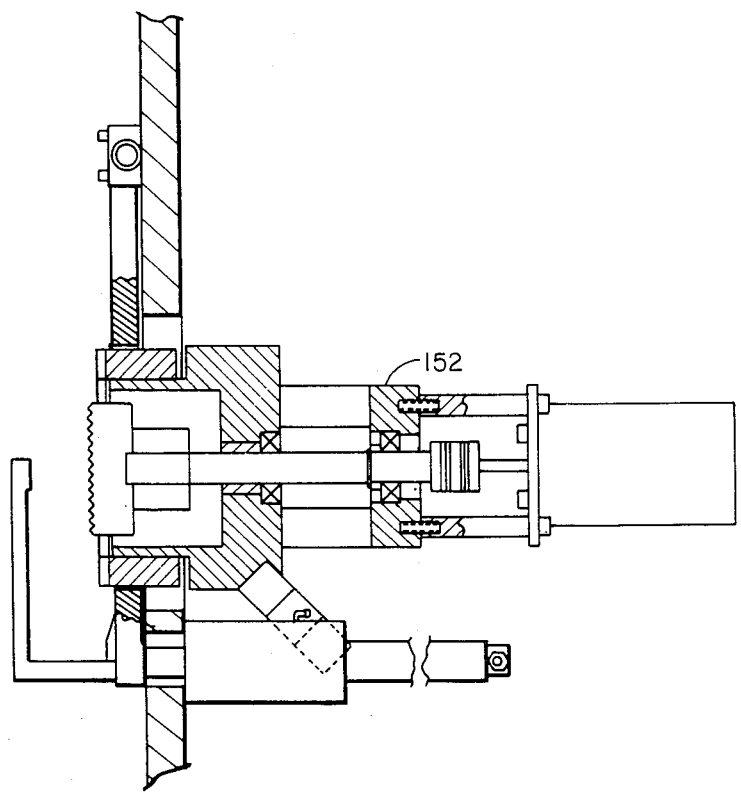
FIG. 13 is a plan view of drive elements at a cartridge cleaning station in advance of a winding station.
Figure 16:
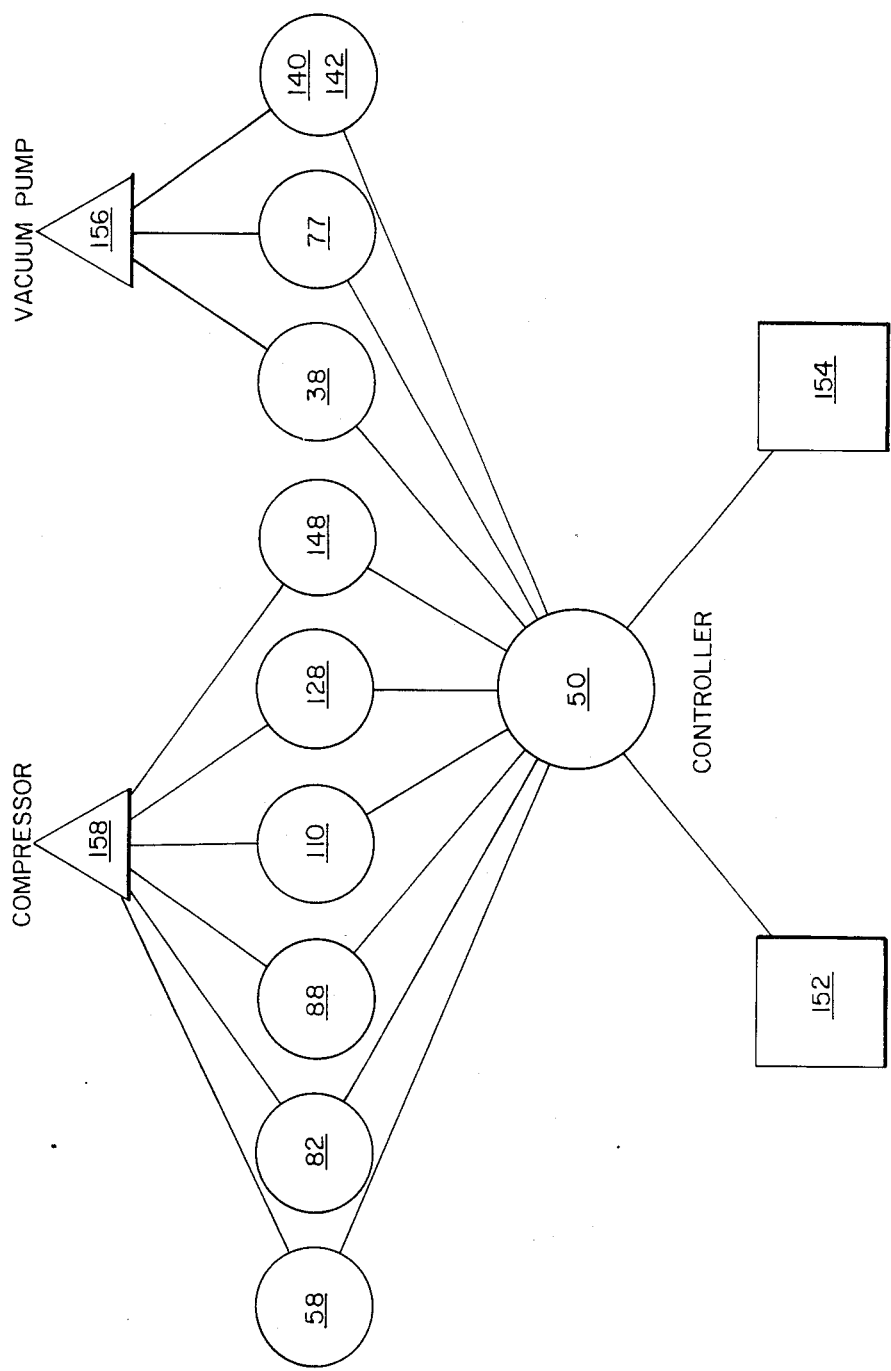
FIG. 16 is a block drawing showing schematically the interrelation of a machine controller, sensing devices and power, compressed air and vacuum sources.

The various machine instrumentalities are timed and actuated under the direction of the controller 50 as shown schematically in FIG. 16. The instrumentalities, in addition to those already described include rotary drives 152 and 154 at the cleaning and winding stations 34 and 36 respectively as seen in FIGS. 13 and 14. The drives 152 and 154 are of conventional design and will accordingly not be described in further detail. There are also included, as shown schematically in FIG. 16, a vacuum pump 156 and a compressor 158 or alternatively a connection to a factory, regulated compressed air supply.

The operation of the tape winding machine will now be summarized with reference to FIG. 16 in which the controller 50 and the actuators, vacuum operated devices and sensors are shown schematically in their relationship to the controller. While the staking device 40 is in its retracted position under the influence of the air cylinder 82, a leader block 24 is supplied to the nest 48 from the chute 122 by the push bar 126 actuated by the cylinder 128. At about the same time and while the staking device is retracted, a staking rod length 30 is inserted into the enlargement 76 from the tube 106 by the air cylinder 110. At this point in the operating cycle, the vacuum sensor in communication through the connector 78 establishes the presence of a rod length 30 in the enlargement 76. The cylinder 58 is then briefly energized to force the rod length 30 out of the enlargement and wedge it in the slot ahead of the punch 74. The vacuum sensor then establishes by a change in vacuum level through the connector 77 (FIG. 8.) that the rod 30 has been displaced from the enlargement 76.

Prior to advancement of the staking device 40 to its forward operative position by the air cylinder 88, a small quantity of loose tape T (FIG. 2) is provided by reversing the winding drive from its normal winding direction. This tape looseness permits the tape to be entrapped between the nested leader block 24 and the slide block 46 as the staking device 40 is projected forwardly. With the tape thus entrapped, the connectors 140 and 142 are placed into communication with the vacuum source to attract and temporarily retain the tape while it is severed by the blade 146, actuated by the air cylinder 148. Meanwhile, the leader block 24 has been retained in the nest 48 by the push bar 126 actuated by the cylinder 128. The air cylinder 58 is now energized, advancing the slide block 46 under the bias of spring 72 toward the leader block 24 and then, as the slide block is engaged with the leader block, overcoming spring 72 to extend the punch itself so as to stake the rod length 30 into the rod-receiving slot of the leader block. The control of the leading end of the tape T from the supply is transferred from the groove 132 and the apertures 134, 136 and 138 and turned over to the finger 38 as apertures in the tape engaging surface of the finger are connected to the vacuum source and the apertures 134, 136 and 138 are disconnected. The transfer of tape control to the finger 38 prepares the apparatus for the start of the next winding operation. The winding drive is then briefly energized as the leader block is released by the push bar 126 to bring the leader block 24 to a position adjacent the opening in the cartridge wall 22, where it is seated by an actuator omitted from this application and drawings but shown and described in my co-pending application. As previously noted, the details of construction of finger 38 and mode of operation are found in my co-pending application.

From the foregoing description of an illustrative embodiment, those of ordinary skill in the winding machine art may be capable of accomplishing many modifications from the showing of the accompanying drawings but still residing within the spirit and scope of the present invention. For example, it may be profitable to employ some of the devices of the present disclosure while substituting different designs for other parts. It is accordingly not intended that the foregoing description and accompanying drawings be taken in a limiting sense but rather that the scope of the invention be interpreted in terms of the appended claims.

What is claimed is:

1. A mechanism for staking a leader block to the end of a tape that has been wound into a cartridge, said staking mechanism comprising:

leader block holding means for holding in a predetermined position a leader block that has a groove for receiving both the end of a tape and a staking rod for staking said tape end to said leader block;

a staking head comprising a staking block having a transversely-extending passageway for receiving a staking rod and a longitudinally-extending slot that intersects said passageway and terminates in a staking rod ejection opening at one end of said staking head, means closing off one end of said passageway, and rod moving means for shifting a staking rod in said passageway stepwise (a) first into said slot and (b) then out of said ejection opening into the said groove of a leader block;

means mounting said staking head for reciprocal movement along a selected axis toward and away from a leader block held by said leader block holding means; and selectively operable means for sequentially (a) operating said rod moving means so as to cause said rod moving means to shift a staking rod from said passageway into said slot, (b) moving said staking head along said selected axis from a first position in which said one end of said staking head is spaced from a leader block held in said predetermined position to a second position in which said one end of said staking head is engaged with a leader block held in said predetermined position, (c) operating said rod moving means so as to cause said rod moving means to eject said staking rod from said slot through said staking rod ejection opening and forcing it into the said groove of a leader block held in said predetermined position, (d) operating said rod moving means so as to retract it away from said rod ejection opening while holding said staking head engaged with a leader block, and (e) subsequently moving said staking head along said axis from said second position back to said first position.

2. A staking mechanism according to claim 1 further including means for sensing when a staking rod is disposed in said passageway.

3. A staking mechanism according to claim 1 further including means for feeding a staking rod into said passageway.

4. A staking mechanism according to claim 1 further including means for locking said staking block against movement from said first position to said second position when said rod moving means is operated to shift a staking rod from said passageway into said slot.

5. A staking mechanism according to claim 1 wherein said rod moving means comprises a rod-shifting member slidably disposed for movement longitudinally in said slot.

6. A staking mechanism according to claim 1 wherein said selectively operable means comprises an energy-driven actuator for operating said rod-shifting member and moving said staking head.

7. A staking mechanism according to claim 6 wherein said selectively operable means comprises a compression spring that coacts with said actuator to provide different driving forces on said rod-shifting member and said staking head when said staking head is engaged with a leader block held in said predetermined position.

8. A staking mechanism according to claim 1 further including selectively operable means for feeding a staking rod into said passageway on command when said staking block is in said first position.

9. A staking mechanism according to claim 8 further including means for locking said staking block in said first position when said staking block has been returned to that position from said second position.

10. A staking mechanism according to claim 9 further including feeding means for feeding a staking rod into said passageway when said staking block is in said first position.

11. A staking mechanism according to claim 10 further including means supporting said staking head for movement transversely of said axis between a first retracted location in which it is disposed in position to receive a staking rod from said feeding means and a second extended location in which it is aligned with a leader block in said predetermined position.

12. A staking mechanism according to claim 11 wherein said feeding means is adapted to lock said staking block in said first position when said staking head is in said first retracted location.

13. A mechanism for staking a leader block to the end of a tape that has been wound into a cartridge, said staking mechanism comprising:
  leader block holding means for holding in a predetermined position a leader block that has a groove for receiving both the end of a tape and a staking rod for staking said tape end to said leader block;
  a staking head comprising a staking block having a circular transversely-extending passageway for receiving a staking rod and a longitudinally-extending slot that intersects said passageway and terminates in a staking rod ejection opening at one end of said staking head, means closing off one end of said passageway, and rod moving means for shifting a staking rod in said passageway along said slot toward said ejection opening;
  means mounting said staking head for reciprocal movement toward and away from a leader block held by said leader block holding means; and
  selectively operable means for means for (a) operating said rod moving means so as to shift a staking rod in said passageway stepwise (1) first along said slot to said ejection opening and (2) subsequently out of said ejection opening into the said groove of a leader block, and (b) moving said staking head from a first position in which said one end of said staking head is spaced from a leader block held in said predetermined position to a second position in which said one end of said staking head is engaged with a leader block held in said predetermined position, and then back to said first position.

14. A mechanism for staking a leader block to the end of a tape that has been wound into a cartridge, said staking mechanism comprising:
  leader block holding means for holding in a predetermined position a leader block that has a groove for receiving both the end of a tape and a staking rod for staking said tape end to said leader block;
  a staking head comprising a staking block having a circular transversely-extending passageway for receiving a staking rod and a longitudinally-extending slot that intersects said passageway and terminates in a staking rod ejection opening at one end of said staking head, means closing off one end of said passageway, and means mounting said staking head for reciprocal movement toward and away from a leader block held by said leader block holding means;
  selectively operable means for sequentially moving said staking head from a first position in which said one end of said staking head is spaced from a leader block held in said predetermined position to a second position in which said one end of said staking head is engaged with a leader block held in said predetermined position, and then back to said first position; and
  rod moving means for shifting a staking rod in said passageway stepwise (a) first into said slot when said staking head is in a first postion and (b) second out of said ejection opening into the said groove of a leader block when said staking head is in said second position.

15. A machine for loading a selected amount of tape into a cartridge and for staking a leader block to the trailing end of that tape by forcing that end and a staking rod into a groove formed in the leader block, said machine comprising:
  means for holding a cartridge to be loaded in a predetermined loading position;
  means for holding a leader block in a predetermined staking position for engagement by a staking rod;
  movable tape positioning means for (a) holding the leading end of a supply of tape, (b) introducing that leading end into the cassette to be loaded, (c) releasing that leading end after a tape winding operation has begun, and (d) reholding the tape after a selected amount of tape has been wound into the cartrige and winding has terminated;
  selectively operable means for winding tape into said cartridge;
  cutter means for severing said tape after winding has terminated;
  a staking head comprising a staking block having a circular transversely-extending passageway for receiving a staking rod from a feeder means and a longitudinally-extending slot that intersects said passageway and terminates in a staking rod ejection opening at one end of said staking head, means closing off one end of said passageway, and means mounting said staking head for reciprocal movement toward and away from a leader block held in said predetermined staking position;
  rod moving means for shifting a staking rod in said passageway stepwise (a) first into said slot when said staking head is in a first postion and (b) second out of said ejection opening into the said groove of a leader block when said staking head is in said second position; and
  selectively operable means for sequentially moving said staking block from a first position in which said one end of said staking head is spaced from a leader block held in said predetermined position to a second position in which said one end of said staking block is engaged with a leader block held in said predetermined position, and then back to said first position.

16. A machine according to claim 15 having a front panel with an opening therein located in line with said staking head, means for moving said staking head between a first location spaced behind said front panel and a second location in which said staking head is disposed in said opening, and means for feeding a staking rod into said passageway when said staking head in in said first location.

17. A machine according to claim 16 wherein said cartridge holding means is mounted on the front side of said front panel.

18. A machine according to claim 16 wherein said cutter means is disposed behind said front panel and comprises a cutter blade and means for reciprocating said cutter blade along an axis extending at substantially a right angle to said front panel, and further wherein said staking block has a slot disposed to receive said cutter blade when said staking block is in its said second position and said cutter blade is moved forward toward said front panel.

19. A machine according to claim 16 wherein said movable tape positioning means is adapted to be moved between said staking block and a leader block located in said staking position into a cartridge located in said loading position, and further wherein said tape positioning means is adapted to hold a tape by suction as it is moved into said cartridge.

20. A machine according to claim 19 further including a programmable controller for operating said tape positioning means, tape winding means, tape cutter means and said staking head according to a predetermined operating sequence.

21. Apparatus for staking the trailing end of a quantity of tape wound in a cartridge to a leader block formed with a staking rod receiving slot and adapted to be engaged in a tape handling mechanism for withdrawing the tape from the cartridge, comprising a stationary mounting plate, a bracket movable from an inoperative position behind the plate to an operative position ahead of the plate, a slide on the bracket, a nest fixed to the bracket for receiving a leader block, a guide block affixed to the slide, a staking punch slidably mounted in the block in alignment with the slot in the leader block and means for temporarily controlling the tape from a supply after the trailing end has been staked to the leader block.

22. Apparatus according to claim 21 further comprising means in the guide block for receiving a length of staking rod ahead of the staking punch and means for advancing the punch toward the leader block to stake the staking rod length and the trailing end of the tape to the slot in the leader block.

23. Apparatus according to claim 22 further comprising means for supplying lengths of rod to a position ahead of the punch and further characterized in that the guide block is formed with an enlargement into which the rod length is received preparatory to the staking action of the punch.

24. Apparatus according to claim 21 further comprising means for advancing the bracket to locate the guide block and punch in operative position ahead of the mounting plate and for retracting the bracket to position the punch in its inoperative position behind the plate.

25. Apparatus according to claim 23 further characterized in that a length of staking rod is loaded into the enlargement while the block is in its retracted position and further comprising a rod length dispenser mounted behind the plate for inserting a length of staking rod into the enlargement at each operating cycle of the apparatus.

26. Apparatus according to claim 21 further characterized in that the guide block is formed with a tape controlling surface and further comprising vacuum holding means in the surface for temporarily retaining the tape under control at the end of a tape winding operation.

27. Apparatus according to claim 26 further characterized in that the vacuum holding means comprises two spaced apart sets of independently controlled vacuum connected apertures in the tape controlling surface.

28. Apparatus according to claim 26 further comprising a tape severing blade effective for severing the tape between the two sets of apertures.

29. A machine for winding a quantity of tape on a reel in a substantially closed cartridge having a limited wall opening closed by a leader block secured to the trailing end of the tape and inserted into the opening, comprising a winding drive at a winding station, means for introducing the leading end of the tape through the opening and entraining the tape on the reel including a finger, means for moving the finger to carry the leading end of the tape into the cartridge to a position in close proximity to the reel, means for severing the tape after a predetermined length of tape has been wound on the reel, means for staking the trailing end of the tape to the leader block and means for transferring control of the tape from a supply to the finger in preparation for a subsequent winding operation.

30. A machine according to claim 29 further characterized in that the staking means includes a slide block and a staking punch and further comprising vacuum holding means on the finger and on an adjacent control surface of the slide block.

31. A machine according to claim 29 further comprising a vertical mounting plate upon which the elements of the machine are supported and further characterized in that the tape staking means is movable from an inactive position behind the plate to an active forward position ahead of the plate.

* * * * *

UNITED STATES PATENT AND TRADEMARK OFFICE
CERTIFICATE OF CORRECTION

PATENT NO. : 4617719

DATED : October 21, 1986

INVENTOR(S) : George M. Woodley

It is certified that error appears in the above-identified patent and that said Letters Patent is hereby corrected as shown below:

Claim 13, column 9, line 32, the words "means for" (second occurrence) should be deleted;

Claim 14, column 10, line 3, the word "postion" should be changed to -- position --;

Claim 16, column 10, line 57, the word "in" (first occurrence) should be changed to -- is --.

Signed and Sealed this

Twentieth Day of January, 1987

*Attest:*

DONALD J. QUIGG

*Attesting Officer*   *Commissioner of Patents and Trademarks*